United States Patent [19]
Archer et al.

[11] Patent Number: 5,482,639
[45] Date of Patent: Jan. 9, 1996

[54] ICE MELTER WITH COATING OF ALPHA-METHYL GLUCOSINE MIXTURE AND METHOD OF MAKING SAME

[75] Inventors: Michael J. Archer, Whitefish Bay; Michael S. Adams; Jeffrey A. Tauri, both of Kenosha, all of Wis.

[73] Assignee: Vigoro Industries, Inc., Fairview Heights, Ill.

[21] Appl. No.: 255,431

[22] Filed: Jun. 8, 1994

[51] Int. Cl.$^6$ .............................. C09K 3/18; C07K 5/00
[52] U.S. Cl. .................... 252/70; 106/13; 252/76
[58] Field of Search .................. 106/13; 252/70, 252/76

[56] References Cited

U.S. PATENT DOCUMENTS

| | | | |
|---|---|---|---|
| Re. 32,477 | 8/1987 | McConnell | 252/70 |
| 4,439,337 | 3/1984 | Nimerick et al. | 252/70 |
| 4,501,775 | 2/1985 | Parks et al. | 427/220 |
| 4,668,416 | 5/1987 | Neal | 252/70 |
| 4,698,173 | 10/1987 | Hansen | 252/70 |
| 4,960,531 | 11/1990 | Conner et al. | 252/70 |
| 4,969,531 | 10/1990 | Connor et al. | 252/70 |

*Primary Examiner*—C. Melissa Bonner
*Attorney, Agent, or Firm*—Lee, Mann, Smith, McWilliams, Sweeney & Ohlson

[57] ABSTRACT

In an improved ice melter comprising an alpha-methyl glucoside and method of making same, an ice melter, as disclosed in U.S. Pat. No. 4,960,531 is further improved in respect to providing improved melting capabilities by providing a substantially uniform coating of alpha methyl glucoside-urea mixture the potassium chloride substrate of a potassium chloride and sodium chloride salt mixture or providing a substantially uniform coating of alpha methyl glucoside-urea mixture to both potassium and sodium chloride salt mixture. The improved invention also includes the method of making the composition which includes the steps for example, of (1) heating a solution of alpha-methyl glucoside;
(2) adding urea to the heated alpha-methyl glucoside;
(3) heating methyl glucoside and urea mixture;
(4) applying the heated alpha methyl-glucoside and urea mixture to potassium chloride; and
(5) adding sodium chloride to the potassium chloride.

20 Claims, No Drawings

ICE MELTER WITH COATING OF ALPHA-METHYL GLUCOSINE MIXTURE AND METHOD OF MAKING SAME

BACKGROUND OF THE INVENTION

1. Field of Invention

This invention relates to improved compositions for melting ice and snow at low temperatures and more particularly, for melting ice on driveways, sidewalks and the like. This invention also contemplates an improved method for making the composition.

2. Description of the Prior Art

De-icing compositions have been used to melt ice, on streets, driveways, sidewalks and the like. De-icing compositions and methods of making de-icing compositions are well known in the art. U.S. Pat. No. 4,960,531, which is assigned to a common assignee, discloses the use of a trigger enhancing agent comprising an alpha-methyl glucoside combination. The '531 Patent includes a sodium and/or potassium chloride enhancer or trigger that in combination with the main salts having an improved melting capability while being free of adverse effects on vegetation and does not leave unsightly coatings due to the fact that less sodium containing material is used to obtain the desired result. This invention is an improvement of the '531 patent in that it limits the accumulation of pure methyl glucoside at various locations in the composition during the production process due to the high electrostatic property of powdered methyl glucoside. An accumulation of methyl glucoside can hinder a homogeneous mixture of the ice melting components. In production the accumulated methyl glucoside may either be disposed of as a waste during routing system cleanup or dropped into the bagging system resulting in packaging of a material for ice melting that is nearly pure methyl glucoside with poor melting capabilities.

OBJECTS OF INVENTION

A principal object of this invention is to provide an de-icing composition which is more efficient in melting snow and ice than present de-icing compositions.

Another principal object of this invention is to provide an improved method of making de-icing compositions, which includes steps for preventing the accumulation of methyl-glucoside.

SUMMARY OF THE INVENTION

While keeping the improved ice melting capabilities, as illustrated and described in U.S. Pat. No. 4,960,531 a further improved ice melter is illustrated and described herein, which continues to remove ice while at the same time eliminate for the most part, damage to vegetation, and household furnishings in that it does not leave unsightly traces and coatings which can damage carpeting and the like. However, this improved ice melting composition limits the accumulation of methyl glucoside by applying a substantial coating of an alpha methyl glucoside-urea mixture to the salt mixture. The method of application of alpha methyl glucoside and urea onto the sodium chloride and potassium chloride substrate is extremely critical due to small amounts of enhancers used (0.835% alpha methyl glucoside and 0.500% urea). Uniform application of these enhancers on the salt substrate is critical to ensure even distribution of each ingredient on the layer of snow or ice to be melted.

DESCRIPTION OF THE PREFERRED EMBODIMENT

The present invention, which is an improvement on the invention disclosed and claimed in U.S. Pat. No. 4,960,531, provides an ice melting composition designed to be operable at low temperatures primarily for use on driveways and sidewalks and the like which in commercial form is a dry stable material that lends itself readily to manual and machine operation. The invention relates to a commercial composition including salt, such as sodium chloride and/or potassium chloride and a melt-lowering enhancer or trigger such as methyl glucoside-urea mixture which is characterized by an enhanced melting capability. From the foregoing, it can be seen that an ice melting composition has been provided which is simple to use and basically harmless to the user and to most of the environment in which it is used and particularly household furnishings and carpeting and wherein the composition includes a salt, preferably a mixture of sodium and/or potassium chloride together with a trigger which is preferably a methyl glucoside-urea mixture.

The preferred chemical enhancing agent is a methyl glucoside mixture, more preferably in the mixture is methyl glucoside which is chemically referred to as an alpha methyl glucoside, a nonreducing derivative of glucose. It has the following chemical formula,

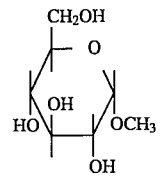

It is believed that the chemical enhancer performs in a synergistic manner so that the ice melting composition performs at lower temperatures than would be expected and ice-melting is accelerated.

In one embodiment, when the methyl glucoside mixture trigger is present in a composition having both potassium and sodium chlorides, the methyl glucoside mixture is preferably therein an amount of about 0.590 to about 3% by weight of the composition. There is a 50/50 ratio of sodium chloride to potassium chloride. The salt combination achieves the best results when the salt combination is about 3 parts by weight of sodium chloride and about 1 part by weight potassium chloride. The percent of urea by weight present in the salt combination ranges from about 0.8% to about 1.1%.

The following description gives a procedure for preparing a sample of the ice melter of this invention.

Full drums of alpha methyl glucoside are emptied into a melt tank. The alpha methyl glucoside is in a semi-liquid state. The melt tank is filled to 75% capacity to allow for addition of urea and prevent overflow of the alpha methyl glucoside-urea mixture. The alpha methyl glucoside is heated in the melt tank with the maximum operating temperature range of between 140 degrees Fahrenheit to 160 degrees Fahrenheit. Urea is added to the melting alpha methyl glucoside in a ratio of 10 parts 50% alpha methyl glucoside for every 3 parts urea. A maximum of 0.5% of an anti-sticking agent is added to the mixture. resulting alpha methyl glucoside-urea mixture is heated to a maximum 160 degrees Fahrenheit and held at 160 degrees Fahrenheit while the mixture is sprayed onto a salt mixture of sodium chloride and potassium chloride. In the preferred embodiment, both the sodium chloride and potassium chloride exist in granular form. The heated alpha methyl glucoside-urea mixture may also be sprayed onto the potassium chloride only, and then adding sodium chloride to the sprayed potassium chloride. The heated alpha methyl glucoside-urea mixture is sprayed in a final proportion of 0.835% alpha methyl glucoside and 0.500% by weight urea. The resulting composition is about 97.8% salt mixture of chlorides and 2.2% alpha methyl glucoside mixture.

Various changes can be made to the invention without departing from the spirit thereof or scope of the claims.

What is claimed is:

1. A method of making an ice melter composition including a salt combination of potassium chloride, sodium chloride and urea and a trigger comprising the steps of:
   (1) heating a solution of alpha-methyl glucoside of the formulation;

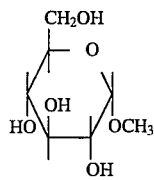

(2) adding urea to heated alpha-methyl glucoside;
   (3) heating alpha methyl glucoside mixture-urea;
   (4) applying the heated alpha methyl glucoside-urea mixture to potassium chloride; and
   (5) adding sodium chloride to the potassium chloride.

2. The method of claim 1 wherein said heating of methyl glucoside is done at temperatures between 140 and 160 degrees Fahrenheit.

3. The method of claim 1 wherein said adding urea is added at a ratio of 3 parts urea to 10 parts 50% alpha methyl glucoside.

4. The method of claim 1 wherein in applying the methyl glucoside and urea mixture to the potassium chloride the methyl glucoside and urea mixture is applied while being held at the maximum temperature of 160 degrees Fahrenheit.

5. The method of claim 1 in applying the heated methyl glucoside and urea mixture, wherein the glucoside-urea mixture is sprayed on said potassium chloride.

6. The method of claim 1 wherein the urea has a maximum 0.5% anti-sticking agent added.

7. The method of claim 1 wherein a 0.835% alpha methyl glucoside and a 0.5% urea proportion of the methyl glucoside-urea mixture is applied to said potassium chloride.

8. The method of making an ice melter composition including a salt combination of chlorides, urea and a trigger comprising the steps of:
   (1) heating a solution of alpha methyl glucoside of the formulation

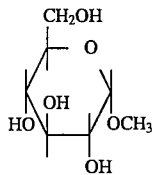

(2) adding urea to heated alpha methyl glucoside;
   (3) heating said alpha methyl glucoside and urea mixture; and
   (4) applying said heated alpha methyl glucoside and urea mixture to a combination of sodium chloride and potassium chloride.

9. The method of claim 8 wherein a 0.835% alpha methyl glucoside and a 0.500% urea proportion of the methyl glucoside urea mixture is applied to the combination of chlorides.

10. The method of claim 8 wherein said heating of methyl glucoside is done at temperatures between 140 and 160 degrees Fahrenheit.

11. The method of claim 8 wherein said adding of urea is done at a ratio of 3 parts urea to 10 parts 50% alpha methyl glucoside.

12. The method of claim 14 wherein when applying the methyl glucoside and urea mixture to the combination of chlorides the methyl glucoside and urea mixture is applied while being held at the maximum temperature of 160 degrees Fahrenheit.

13. The method of claim 8 wherein in applying the heated alpha methyl glucoside and urea mixture, said alpha methyl glucoside-urea mixture is sprayed on the combination of sodium chloride and potassium chloride.

14. The method of claim 8 wherein the urea has a maximum 0.5% anti-stiking agent added.

15. A method of making an ice melter composition including a salt combination and trigger enhancing agent, said trigger comprising alpha-methyl glucoside of the formulation

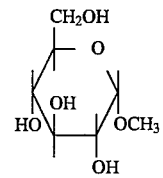

said salt combination includes a mixture of granular sodium chloride and granular potassium chloride, said alpha-methyl glucoside substantially coating said salt combination of granular sodium chloride and granular potassium chloride comprising the steps of:
   (1) heating a solution of said alpha-methyl glucoside;
   (2) adding urea to said heated alpha methyl glucoside;
   (3) heating said alpha methyl glucoside-urea mixture;
   (4) applying said heated alpha methyl glucoside-urea mixture to said granular sodium chloride and to said granular potassium chloride.

16. The method of claim 15 wherein said trigger is present in an amount from about 0.5% to about 3% weight of the composition.

17. The method of claim 15 wherein said salt combination includes urea.

18. The method of claim 17 wherein said urea has a maximum 0.5% anti-sticking agent included.

19. The method of claim 15 wherein said salt combination is about 3 parts by weight of sodium chloride and about 1 part by weight of potassium chloride.

20. The method of claim 17 wherein said urea is present in from 0.8% to about 1.1% by weight of the salt combination.

* * * * *

UNITED STATES PATENT AND TRADEMARK OFFICE
CERTIFICATE OF CORRECTION

PATENT NO. : 5,482,639
DATED : January 9, 1996
INVENTOR(S) : Michael J. Archer, et al.

It is certified that error appears in the above-identified patent and that said Letters Patent is hereby corrected as shown below:

On the title page, item [54] an column 1 line 2, in the title, change "GLUCOSINE" to read --GLUCOSIDE--.

Signed and Sealed this

Thirtieth Day of July, 1996

Attest:

BRUCE LEHMAN

*Attesting Officer*  *Commissioner of Patents and Trademarks*